United States Patent
Panthi et al.

(10) Patent No.: US 11,595,115 B2
(45) Date of Patent: Feb. 28, 2023

(54) DUAL APERTURE DUAL MODEM SATCOM TERMINAL

(71) Applicant: Thales Avionics, Inc., Irvine, CA (US)

(72) Inventors: Sunil Panthi, Melbourne, FL (US); Arnaud Tonnerre, Rockledge, FL (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 17/406,327

(22) Filed: Aug. 19, 2021

(65) Prior Publication Data

US 2022/0368415 A1    Nov. 17, 2022

Related U.S. Application Data

(60) Provisional application No. 63/188,001, filed on May 13, 2021.

(51) Int. Cl.
H04B 7/185    (2006.01)

(52) U.S. Cl.
CPC .................. H04B 7/18578 (2013.01)

(58) Field of Classification Search
CPC . H01Q 3/26; H04B 7/19; H04B 7/195; H04B 7/185; H04B 7/18502; H04B 7/18506; H04B 7/18508; H04B 7/18517; H04B 7/18578; H04B 7/18504
See application file for complete search history.

(56) References Cited

U.S. PATENT DOCUMENTS

| | | | | |
|---|---|---|---|---|
| 9,647,748 B1 * | 5/2017 | Mitchell | ............ | H04B 7/18508 |
| 9,750,079 B1 * | 8/2017 | Mitchell | ............ | H04B 7/18508 |
| 10,566,683 B1 * | 2/2020 | Campbell | ................ | H01Q 3/36 |
| 10,574,337 B1 * | 2/2020 | Chari | ................ | H04B 7/18526 |
| 2003/0034422 A1 * | 2/2003 | Higgins | ................ | H04B 7/195 244/158.4 |
| 2021/0234270 A1 * | 7/2021 | Stoleru | ............. | H01Q 21/0006 |

FOREIGN PATENT DOCUMENTS

| | | | | |
|---|---|---|---|---|
| JP | 3841526 B2 * | 11/2006 | ......... | H04B 7/18504 |
| JP | 4203225 B2 * | 12/2008 | ............... | H01Q 3/08 |
| WO | WO-02103932 A1 * | 12/2002 | ......... | H04B 7/18506 |

* cited by examiner

*Primary Examiner* — Blane J Jackson
(74) *Attorney, Agent, or Firm* — Sage Patent Group

(57) ABSTRACT

An aircraft based satellite communication (SATCOM) terminal includes a broadband aperture configured to communicate through non-geostationary orbit (NGSO) satellites for broadband communications, a management aperture configured to receive NGSO satellite management information from a geostationary orbit (GSO) satellite, and at least one processor that performs operations. The operations receive the NGSO satellite management information from the GSO satellite, where the NGSO satellite management information indicates positions and associated time of a set of the NGSO satellites. The operations acquire a second communication link with a second NGSO satellite among the set using the NGSO satellite management information during handoff switching from using a first communication link that was previously acquired with a first NGSO satellite to using the second communication link being acquired with the second NGSO satellite. The operations then perform broadband communications through the broadband aperture and the second communication link with the second NGSO satellite. Related ground-based control centers are disclosed.

19 Claims, 11 Drawing Sheets

DUAL APERTURE DUAL MODEM SATCOM TERMINAL

CROSS REFERENCE TO RELATED APPLICATION

This application claims the benefit of U.S. Provisional Patent Application Ser. No. 63/188,001, filed on May 13, 2021, the disclosure and content of which is incorporated by reference herein in its entirety.

FIELD

The present disclosure relates to aeronautical broadband communication systems including satellite communication systems for aircraft.

BACKGROUND

Commercial aircraft provide broadband data traffic communications, e.g., Internet, for passengers through satellite communication systems. These systems are being designed for use of mixed orbit inflight connectivity service where service will be delivered from satellites that are a mix of Non Geostationary Orbit (NGSO) Satellite and Geostationary Orbit (GSO) Satellite. NGSO includes Medium Earth Orbit (MEO), Low Earth Orbit (LEO), and Highly Elliptical Orbit (HEO) satellites. GSO includes Geosynchronous Equatorial Orbit (GEO) satellites. FIG. 1 illustrates aeronautical communications services provided through NGSO satellites overlaid by a GSO satellite.

A commercial broadband system using NGSO satellites for aircraft communications has not yet been demonstrated. SpaceX recently shared its intention of extending the Starlink (LEO Broadband System) service to aircraft in its blanket license application to FCC. Over decades, aeronautical broadband service has been primarily delivered using GSO satellites. With the introduction of the next-generation LEO satellite constellations, airline operators are eager to offer passenger low-latency high-speed inflight connectivity. However, the aeronautical antenna and modem technology will have substantial challenges. Some challenges that arise when attempting to deliver inflight connectivity to commercial aviation using next-generation NGSO satellites, primarily LEO satellites, include the following:

1) Approximate broadband communication service disruption of about 7 seconds occurring every 5 to 6 minutes;
2) Higher probability of acquisition failure when attempting to join the moving NGSO satellite;
3) Frequent occurrences of aircraft satellite communication systems needing to operate without access to accurate information needed to assist with tracking the ever moving fleet of NGSO satellites; and
4) Waste of large bandwidth due to replication of multicast terrestrially and over the NGSO satellites.

SUMMARY

Some embodiments of the present disclosure are directed to an aircraft based satellite communication (SATCOM) terminal that includes a broadband aperture, a management aperture, at least one processor, and at least one memory storing instructions executable by the at least one processor to perform operations. The broadband aperture is configured to communicate through non-geostationary orbit (NGSO) satellites for broadband communications. The management and broadcast-multicast aperture is configured to receive, from a geostationary orbit (GSO) satellite, NGSO satellite management information. The operations receive the NGSO satellite management information from the GSO satellite, where the NGSO satellite management information indicates positions and associated time of a set of the NGSO satellites. The operations acquire a second communication link with a second NGSO satellite among the set using the NGSO satellite management information during handoff switching from using a first communication link that was previously acquired with a first NGSO satellite to using the second communication link being acquired with the second NGSO satellite. The operations perform broadband communications through the broadband aperture and the second communication link with the second NGSO satellite.

Accordingly, the aircraft based SATCOM terminal can more quickly and reliably acquire the second communication link with the second NGSO satellite by its use of the NGSO satellite management information which indicates positions and associated time of a set of the NGSO satellites, including the second NGSO satellite.

In some further embodiments disclosed herein, the operations may control directional pointing of the broadband aperture based on a position of one of the NGSO satellites determined from the NGSO satellite management information to acquire the second communication link with the NGSO satellite. The operations may control transmitter and/or receiver signaling timing for acquiring the second communication link with the second NGSO satellite, based on location of the second NGSO satellite indicated by the NGSO satellite management information and based on location of an aircraft transporting the SATCOM terminal as obtained from a communication bus of the aircraft. The operations may control transmission power level through the management and broadcast-multicast aperture toward the second NGSO satellite based on the position of the second NGSO satellite indicated by the NGSO satellite management information and based on position of an NGSO satellite gateway Earth station which is indicated by the NGSO satellite management information and which is serving the second NGSO satellite, to acquire the communication link with the second NGSO satellite.

In some further embodiments disclosed herein, the operations may estimate frequency to be used for receiving signaling from the second NGSO satellite during acquisition and/or to be used for transmitting signaling to the second NGSO satellite during acquisition, based on frequency drift indicated by the NGSO satellite management information for the second NGSO satellite and for an NGSO satellite gateway Earth station serving the second NGSO satellite. The operations may estimate frequency to be used for receiving signaling from the second NGSO satellite during acquisition and/or to be used for transmitting signaling to the second NGSO satellite during acquisition, based on the speed and direction of the second NGSO satellite indicated by the NGSO satellite management information and based on speed and direction of an aircraft transporting the SATCOM terminal as obtained from a bus of the aircraft.

In some further embodiments disclosed herein, the SATCOM terminal includes a broadband modem coupled to the broadband aperture and which is configured by the operations to establish the second communication link for bidirectional communications through the second NGSO satellite using the NGSO satellite management information, and includes a management and broadcast-multicast modem coupled to the management and broadcast-multicast aperture and which is configured by the operations to receive the NGSO satellite management information from the GSO satellite.

Some other embodiments are directed to a related ground-based control center that includes at least one network interface configured to communicate through at least one GSO satellite gateway Earth station with a GSO satellite, a processor, and at least one memory storing instructions executable by the at least one processor to perform operations. The operations generate NGSO satellite management information indicating positions and associated time of a set of NGSO satellites, and communicate the NGSO satellite management information through the at least one GSO satellite gateway Earth station and the GSO satellite to aircraft based SATCOM terminals configured to use the NGSO satellite management information to acquire the NGSO satellites in the set during handoff switching between the NGSO satellites in the set for broadband communications.

Other aircraft based SATCOM terminals and ground-based control centers, and related methods, and computer program products according to embodiments of the inventive subject matter will be or become apparent to one with skill in the art upon review of the following drawings and detailed description. It is intended that all such additional aircraft based SATCOM terminals and ground-based control centers, and related methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
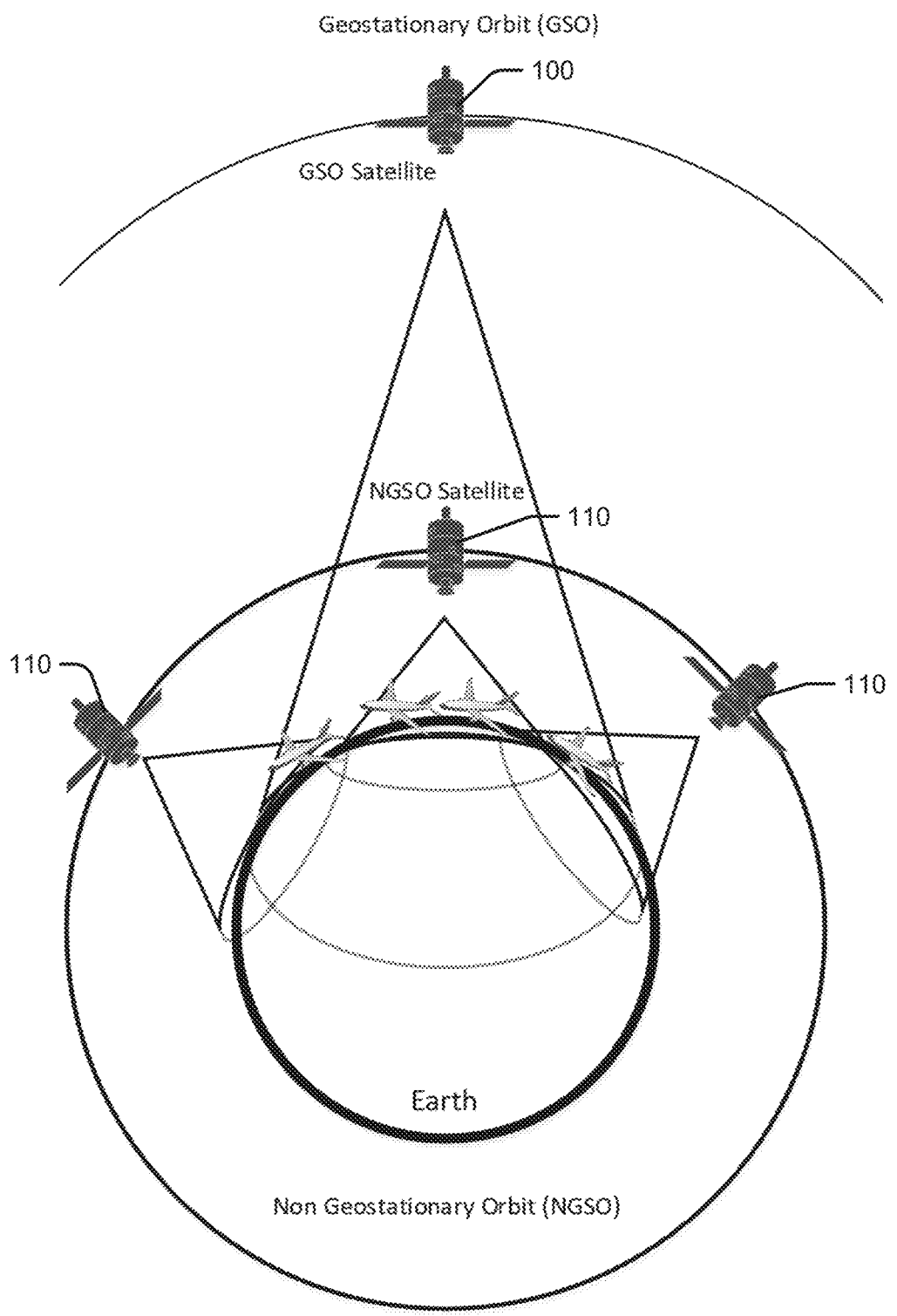
FIG. 1 illustrates aeronautical communications services provided through NGSO satellites overlaid by a GSO satellite.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Inflight broadband connectivity hasn't been delivered over LEO satellites because of the challenges that have been described above and herein. Broadband connectivity has been demonstrated through MEO (O3B) satellites as a proof of concept through a test flight using a single aperture-single beam antenna. Because of the relatively lower recurrence of the satellite switch, the velocity of the satellites, and the predictability of the orbit, the challenges for providing broadband connectivity through MEO satellites were not as extensive as for providing broadband connectivity through LEO satellites.

However, current antenna and modem technology are not adequate to provide inflight broadband connectivity through LEO satellites. Implementing inflight broadband connectivity with current antenna and modem technology faces new challenges, which include:

1) Higher recurrence of satellite switching, e.g., nominally every 5-6 minutes;
2) Disruption of service for approximately 7 seconds every 5-6 minutes;
3) Higher probability packet drop due to large variation in propagation delay;
4) Lag and lapse in tracking information of several satellites in mixed orbits of different inclination;
5) No or inaccurate satellite position and time information when an aircraft is returned to service after being grounded, e.g., for maintenance; and
6) Large consumption of bandwidth for multicast television delivery.

Various embodiments of the present disclosure are directed to addressing one or more of the above challenges. Some embodiments are directed to a ground based control center (300 FIG. 3) that broadcasts NGSO management information through a GSO gateway Earth station and GSO satellite to aircraft within the GSO satellite footprint. The aircraft based SATCOM terminals are configured to use the received NGSO management information to assist with acquiring NGSO satellites and performing handoff switching between NGSO satellites for broadband communications. The NGSO satellites can include, without limitation, Medium Earth Orbit (MEO), Low Earth Orbit (LEO), and/or Highly Elliptical Orbit (HEO) satellites. The NGSO management information broadcasted through the GSO satellite informs the aircraft based SATCOM terminals in real-time using GSO satellite pathway providing out of band access to the NGSO satellite position and associated time, satellite velocity, and/or other information. Some of these embodiments are also directed to providing spectral resource efficient delivery of television using multicast through GSO satellites, which can be provided in conjunction with the NGSO management information. The term "NGSO management information" is also referred to herein as "management information" and "management and control information."

Aircraft Based SATCOM Terminal

Figure 2:
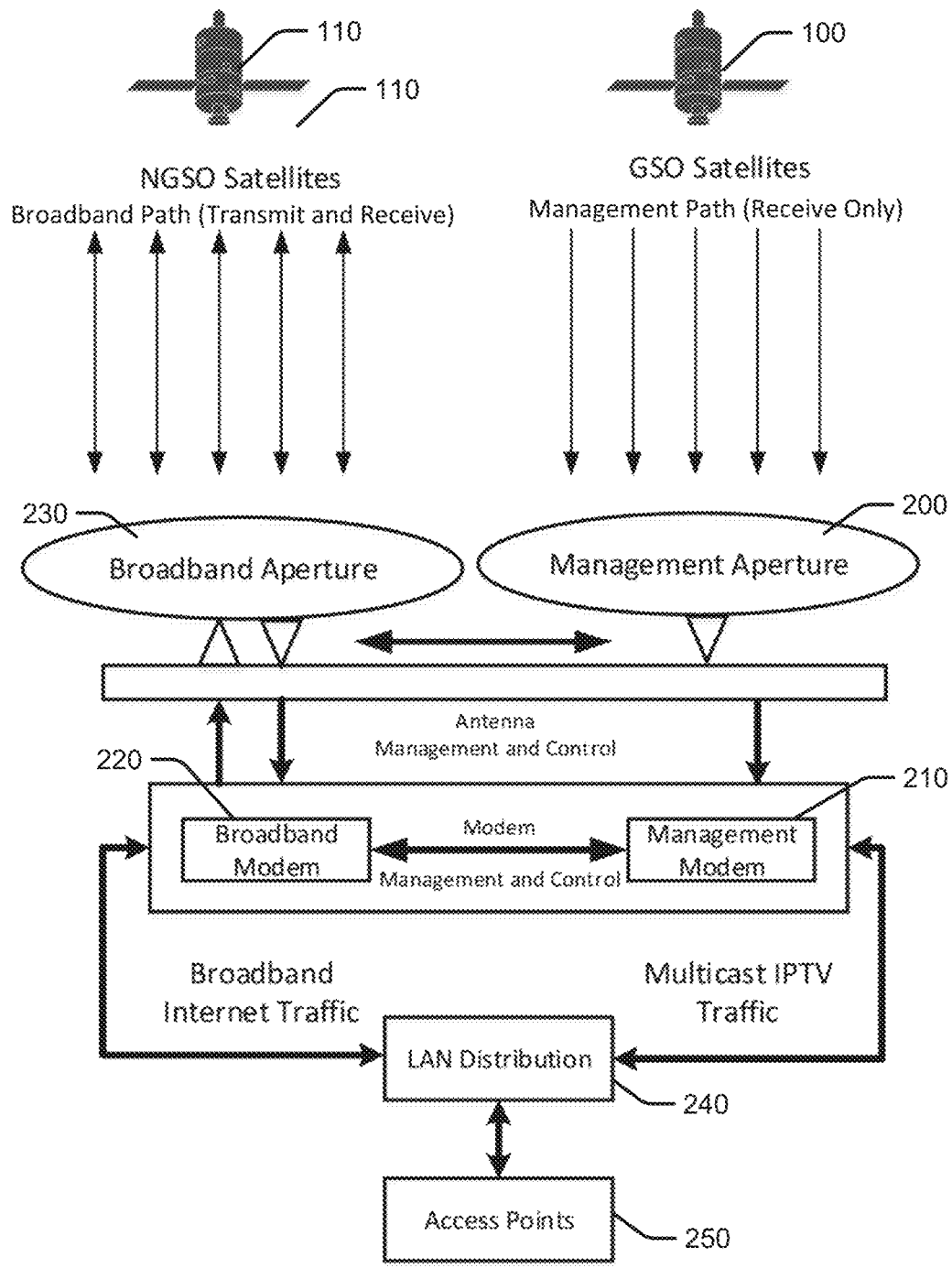
FIG. 2 illustrates a block diagram of a dual aperture dual modem for an aircraft based SATCOM terminal which is configured according to some embodiments of the present disclosure.

An aircraft based SATCOM terminal can be configured with a dual aperture dual modem in accordance with some embodiments. FIG. 2 illustrates a block diagram of a dual aperture dual modem for an aircraft based SATCOM terminal which is configured in accordance with some embodiments.

Referring to FIG. 2, the modem is configured to receive management information via a management path (also referred to as "management plane") through a GSO satellite. The management information is used to configure broadband data communications via a broadband path (also referred to as "traffic plane") through NGSO satellites. The antenna system includes a dual aperture: 1) a broadband aperture 230 configured and operated for communicating through NGSO satellites; and 2) a management aperture 200 configured and operated for receiving management information through GSO satellites.

The dual aperture antenna may be a horn array or an electrically scanned phased array. Electronically scanned phased array antenna generally require two apertures—each for transmit and receive. The receive aperture can create two independent and electronically steerable receive beams. One beam may provide a function as receive path of the broadband aperture steered towards NGSO satellites (e.g., LEO satellites). The second beam is operated as the receive path of management aperture steered towards the GEO satellite. The second physical aperture of an electronically scanned phased array can function as transmit path of the broadband aperture steered towards the NGSO satellites (e.g., LEO satellites).

The broadband aperture 230 functions as a primary broadband communication antenna terminal with a bidirectional (transmit and receive) aperture configured to provide a high slew rate with an ability to track NGSO satellites, such as LEO satellites, while operating at cruising speed of commercial aircraft. The broadband communications can include passenger inflight entertainment traffic, such as streaming movies, streaming music, streaming games, file transfers, Internet browser data, etc., from network content servers via the Internet, cellular data (e.g., phone calls) from a cellular network, crew communications, aircraft operations and maintenance data, etc. Performance characteristics of the terminal can be configured to meet or exceed the operating threshold of LEO broadband services.

The management aperture 200 functions as a unidirectional (receive only) antenna with an ability to track a minimum of GEO satellites while operating at the cruising speed of commercial aircraft. Performance characteristics of the terminal can also be configured to meet or exceed the operating threshold of GEO multicast service.

Dual Aperture Dual Modem SATCOM Terminal

With continued reference to FIG. 2, the modem is further configured with a dual modem: 1) a broadband modem 220; and 2) a management modem 210.

The broadband modem 220 is coupled, e.g., through a dedicated link, to a broadband aperture 230. The broadband modem 220 has a bidirectional link (transmit and receive) which can be configured to provide bidirectional broadband data service, e.g., Internet streaming and browsing, to airline passengers and crew via LEO satellites. The waveform of the broadband modem 220 is configured to be compatible with the LEO satellite system.

The management modem 210 is connected to the management aperture 200 of the antenna system with the receive-only link. A single receiver can be configured to function as the management modem 210 according to some embodiments, and have a waveform compatible with GEO multicast service.

As will be explained in further detail below, the management information broadcasted through the GSO satellite is used to assist the broadband modem 220 and broadband aperture 230 with acquiring communications links with NGSO satellites and performing handoff between NGSO satellites for bidirectional broadband data service through the broadband modem 220 and the broadband aperture 230. The management information can be used to control broadband antenna pointing and tracking of NGSO satellites, transceiver power management for transmissions to NGSO satellites, transceiver frequency correction for transmitting and receiving signals with the NGSO satellites, transceiver timing synchronization for transmitting and receiving signals with the NGSO satellites, etc., as described below.

Broadband traffic, e.g., Internet traffic, can communicated to seat video display units and/or passenger electronic devices (PEDs) through a LAN distribution network and access points. Example PEDs include, without limitation, smart phones, table computers, laptop computers, gaming consoles, extended reality headsets, etc. The access points can include wired network connections, e.g., Ethernet, and can include wireless connections via, e.g., wireless local area network access points. In some embodiments, IP television is streamed from a ground content server to a ground mission control center (300 FIG. 3) which communicates the IP television through a GEO satellite gateway Earth stations for multicast distribution to GEO satellites. The management modem 210 via the management aperture 200 can receive the multicast IP television traffic through the GEO satellite for distribution via the LAN distribution network to access to seat video display units and/or PEDs.

Although various embodiments are described in the context of the management aperture 200 and management modem 210 being configured and used to communicate with GSO satellites to receive management and control information for use in controlling the broadband modem 220 and broadband aperture 230 for communicating through NGSO satellites, in some other embodiments the management aperture 200 and the management modem 210 are configured to receive management and control information from NGSO satellites. For example, the management and control information could be received by the management aperture 200 and management modem 210 through MEO satellites for use in controlling the broadband modem 220 and aperture for communicating through LEO satellites. The MEO satellites would necessitate less frequent satellite switching than LEO satellites and would provide benefit, although less than for GEO satellites, in obtaining updated management information for use in controlling the broadband modem 220 and aperture for communicating through LEO satellites.

Moreover, although some embodiments are described in the context of the broadband aperture 230 and broadband modem 220 being configured to communicate through LEO satellites, they may alternatively or additionally be configured to communicate through another type of NGSO satellites, such as MEO satellites. Thus, the management information may be received through a GSO satellite for use in controlling acquisition and performing handoff between MEO satellites that are used for broadband communications.

Moreover, although some embodiments are described in the context of the management aperture 200 functioning as a unidirectional (receive only) antenna, in some other embodiments the management aperture 200 functions as a bidirectional (transmit and receive) antenna.

It is to be understood that references made herein to GSO satellites can be interchangeably referred to as GEO satellites and vice versa.

Operational Functions of Combined GSO and NGSO Satellite System

Figure 3:
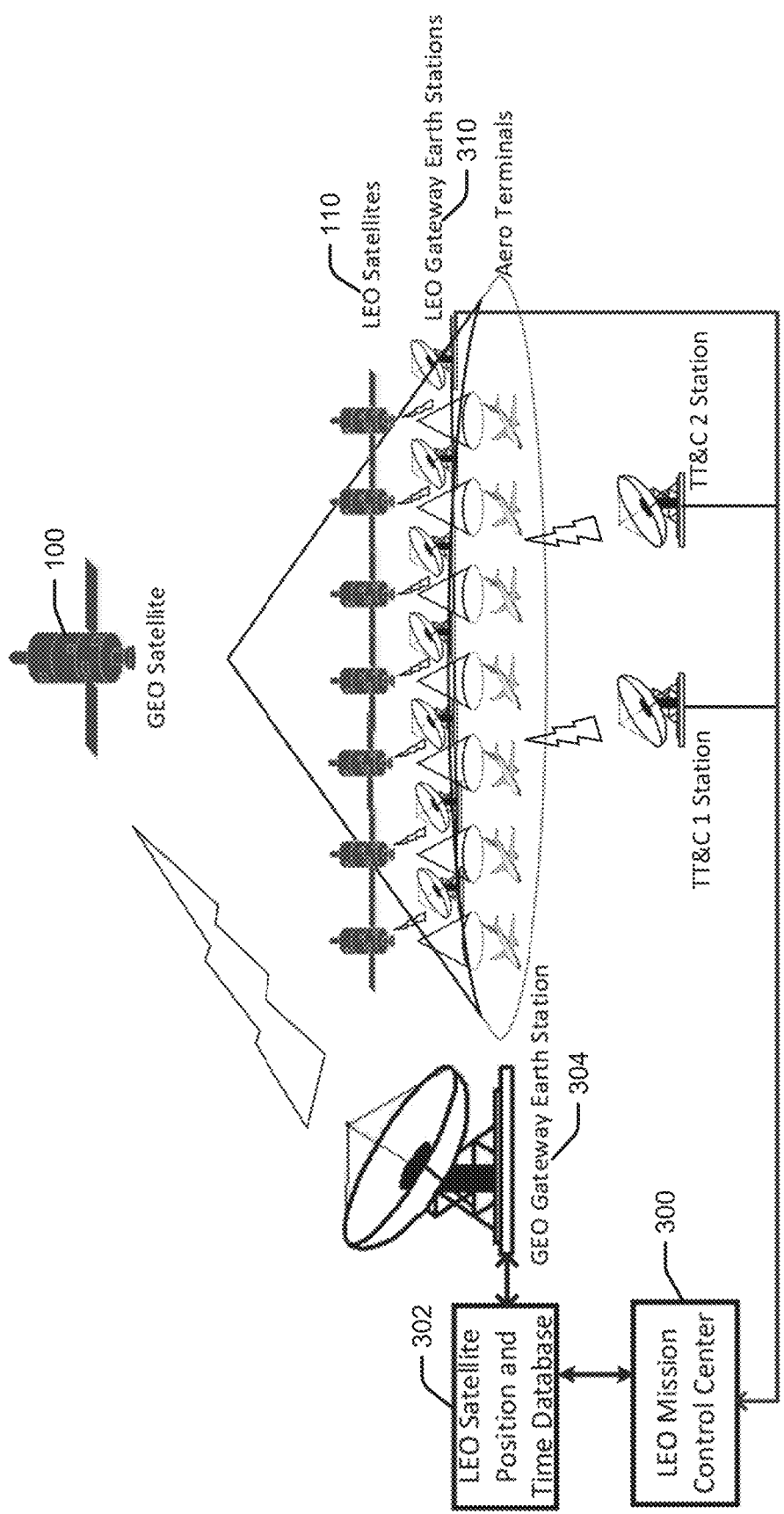
FIG. 3 illustrates a block diagram with indicated communications for the ground based and combined GSO and NGSO satellite system according to some embodiments of the present disclosure.

The operational functionality of the combined GSO and NGSO satellite system can be primarily divided into 1) Broadband and 2) Management & Multicast (M&M). FIG. 3 illustrates a block diagram with indicated communications for the ground based and combined GSO and NGSO satellite system in accordance with some embodiments.

The system provides broadband data communications (e.g., high-speed Internet connectivity) through NGSO satellites, such as LEO satellites, using management and control information (also referred to as the management portion of M&M information) communicated through a GSO satellite (e.g., GEO satellite). The system can be configured to provide high bandwidth downlink and uplink channels delivering Gbps of speed with a latency of below 50 milliseconds to a single aircraft. The system is configured to switch to a new LEO satellite approximately every 5-6 minutes. In a single flight, aircraft may operate through many different LEO satellites spaced apart across several time zones. In doing so the aircraft antenna must closely track and switch between LEO satellites. Several landing stations (ground earth station) bridge LEO satellites with Point of Presence (PoP). The broadband communications are provided by a combination of broadband aperture and modem operations. However, they rely on the management path to receive critical management control information such as satellite positions and associated time, altitudes, frequency plan, etc. as will be described in further detail below.

In FIG. 3, the LEO mission control center 300 determines the management and control information which is to be updated in the LEO satellite database for transmission through a GEO satellite gateway Earth station to a GEO satellite which relays the communications to aircraft based SATCOM terminals operating in the GEO satellite coverage cell. The management and control information is adapted to assist the aircraft based SATCOM terminals with acquiring LEO satellites (or other NGSO satellites) and performing handoff between LEO satellites during ongoing bidirectional broadband data service. As will be explained in further detail below the LEO satellite database is updated to indicate positions and associated times of the LEO satellites, signaling characteristics (e.g., frequency, timing, etc.) for the LEO satellites, and other information for the LEO satellites.

To ensure uninterrupted broadband communication service (e.g., Internet) delivered via LEO satellites, the management and control information is sent to the aircraft based SATCOM terminals via GEO satellites, which form an "out-of-band" path relative to the LEO satellite paths. GEO satellites provide an ideal pathway because they have the largest service field-of-view and can effectively capture near-entire-global coverage with, e.g., only three ideally spaced satellites. Additionally, the relative position of the GSO satellite is fixed and predictable which facilitates communication link acquisition of the GSO satellite by an aircraft based SATCOM terminal. Commercial aircraft are highly mobile and can have an extended range of up to 19 hours. The LEO mission control center 300 can provide a functional local interface between the broadband and management paths which can be updated and synchronize the management and control information in, e.g., real-time. Additionally, multicast applications such as television service can be provided as a function of the management path for reasons that are explained below.

In some embodiments, the LEO mission control center 300 transmits the same set of positions and associated times and other information for all LEO satellites and associated ground stations through the set of GEO satellites for use by the aircraft SATCOM terminals. In contrast, some other embodiments of the LEO mission control center 300 operate to transmit only a selected subset of the set of LEO satellites and associated ground stations positions and other information transmitted through a selected one of the GEO satellites based on which of the LEO satellites among the larger constellation of operational LEO satellites are predicted to be within the service coverage area of the selected one of the GEO satellites. Selectively transmitting the subset of LEO satellite and associated ground station positions and other information reduces the uplink and downlink resource utilization of the selected GEO satellite path by avoiding transmission of position information for LEO satellites that are not predicted to be presently within the service coverage area of the selected GEO satellite.

Challenges Addressed by Dual Aperture Dual Modem SATCOM Terminal

Various operational challenges and associated operational features which can be addressed by various dual aperture dual modem SATCOM Terminals configured in accordance with embodiments of the present disclosure are now explained.

Satellite Position and Time

The relative position of an LEO satellite changes in time. Antenna direction pointing and tracking of LEO satellites by the SATCOM terminal can be effectively controlled using the management information received through the GEO satellite. A single aircraft during a flight route is serviced by many LEO satellites which may be in different inclination, altitudes, and ranges. Moreover, a single LEO satellite may service an aircraft for approximately 5-6 minutes or even less. When hundreds of aircraft are considered in the large geographical region, it becomes challenging to provide accurate LEO satellite position and associated time information updates to all aircraft. Without such information, the broadband aperture antenna cannot be pointed toward a target LEO satellite and cannot track movement of the target LEO satellite. This results is complete loss of broadband service while the SATCOM terminal attempts to perform acquisition and handoff from one LEO satellite to another LEO satellite.

Figure 7:
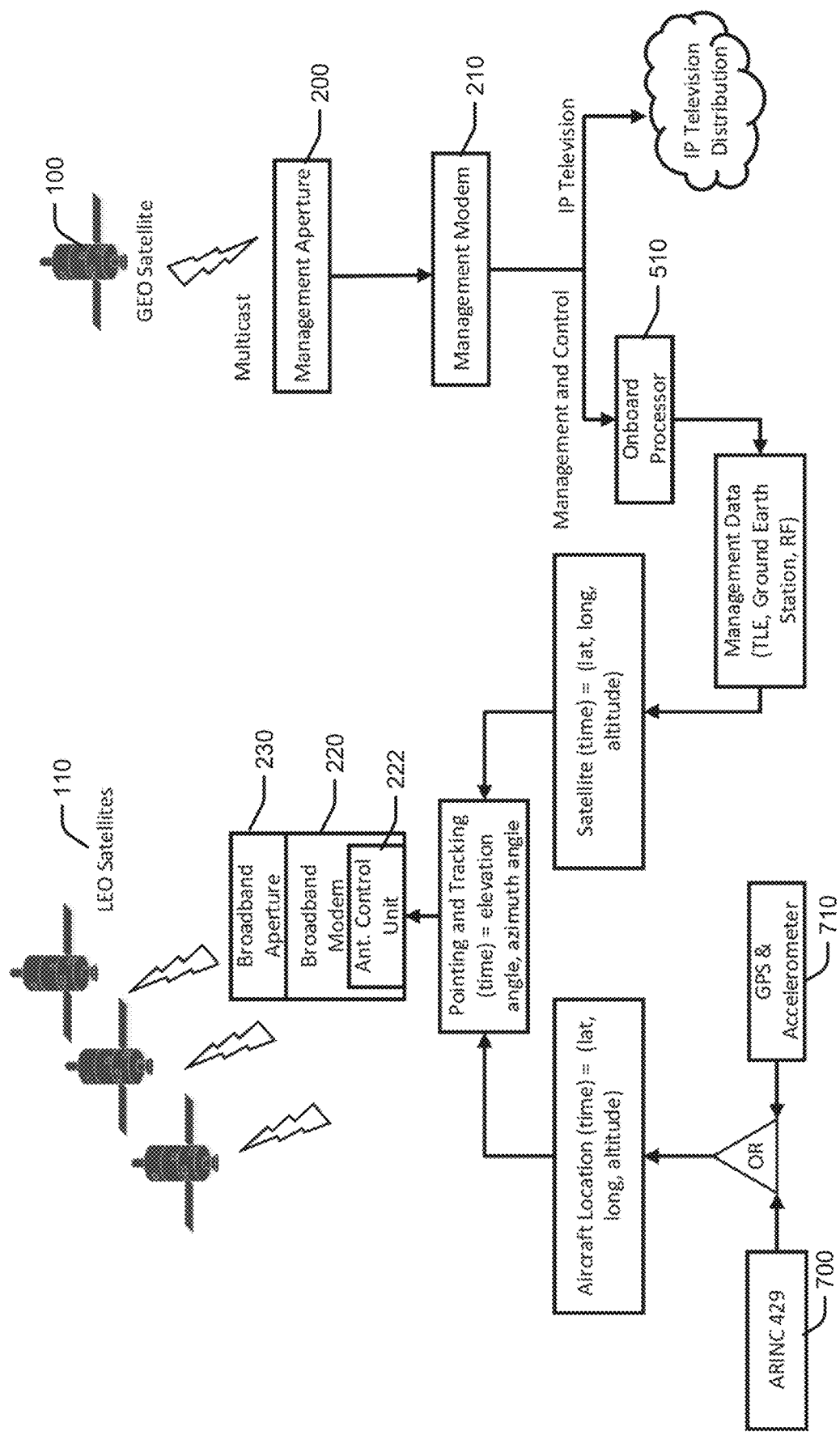
FIGS. 7-10 illustrates block diagrams of various aircraft based SATCOM terminals which are configured according to some embodiments of the present disclosure.

These challenges are overcome by the system of FIG. 3 in which the LEO mission control center 300 acquires the position and associated timing information of all LEO satellites, and transmits the information through the GEO satellite gateway Earth station and GEO satellite for receipt by SATCOM terminals on aircraft within the service area of the GEO satellite. The information is updated and periodically broadcasted to all such aircraft via GEO satellite. The management aperture 200 of the antenna on the aircraft SATCOM terminal receives the information and forwards part of the information to an Antenna Control Unit (ACU) 222 (FIG. 7). The ACU 222 provides the pointing and tracking function for the broadband antenna aperture.

Burst Time Plan Estimation

The broadband modem 220 employs time division multiple access (TDMA), so the precise location of the LEO satellite in addition to the position of aircraft (terminal) and ground Earth station (landing station) is critical for transmitter and receiver signaling timing. The information shared with the ACU 222 is therefore made available to the broadband modem 220 for use in performing precise TDMA burst time plan estimation and avoiding collision during LEO satellite acquisition, handoff and operation. The broadband modem 220 acquires this information via the management modem 210.

Power Estimation and Control

Immediately after performing handoff between LEO satellites the broadband modem 220 must transmit at a power level that is within the dynamic range of the demodulator and at correct level for error-free demodulation of the acquisition or switched-to LEO satellite. Transmitting at high or low power may result in longer LEO satellite switch times or unsuccessful acquisition of the satellite beam.

The free space loss variation from highest to the lowest is negligible in the GEO satellite. However, propagation variation from the best to the worst has a factor of 4.68 in a LEO satellite with an altitude of 610 Km, which will result in large free space loss variation. When contribution from both aircraft to LEO satellite and from satellite to ground station, the combined variation can be as high as a factor of 12 for a LEO satellite with an altitude of 610 Km.

In accordance with embodiments herein, information indicating the LEO satellites positions and associated time and indicating the ground station (GSO satellite gateway transmitter) position is broadcasted or multicasted through the GEO satellite and received by the management aperture and modem. The position of the ground station, satellite, and aircraft enables the broadband modem 220 to calculate the transmit power accounting for the free space loss at the time of transmission. Accordingly, providing the LEO satellite positions and associated time and the ground station positions through the GEO satellite for receipt by the management modem 210, enables its use by the broadband modem 220 to accurately predict and control the transit power while adjusting for the free space loss.

Velocity Variations Between LEO Satellites and Aircraft

Figure 4:
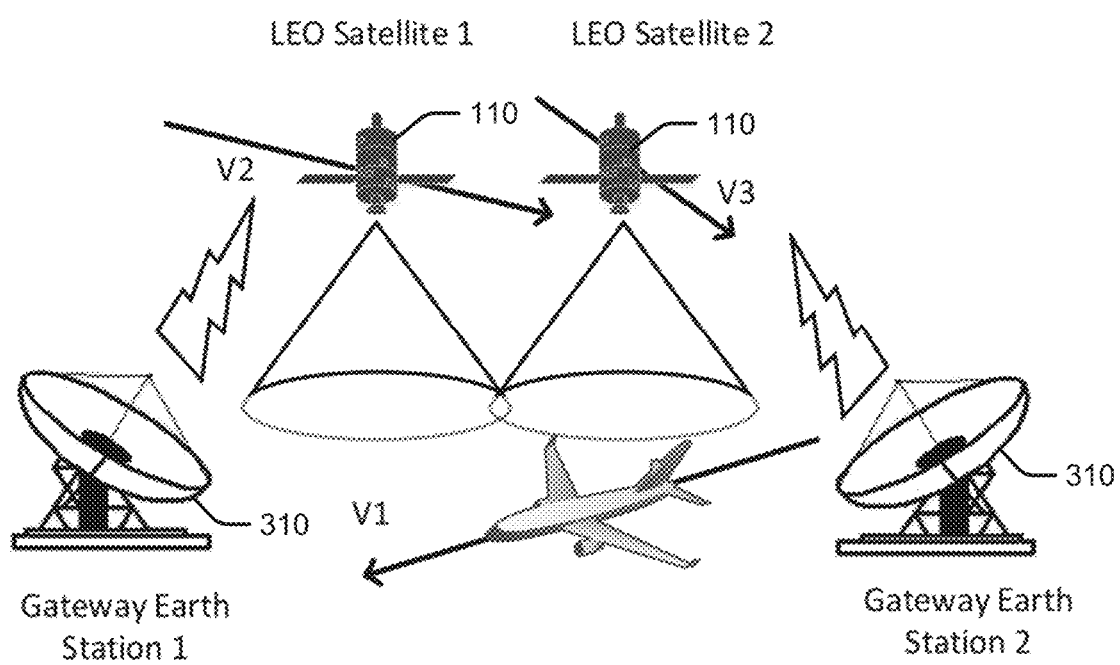
FIG. 4 illustrates example velocity vectors of a pair of LEO satellites relative to an aircraft velocity vector.

The relative velocity of the LEO satellite changes with respect to the aircraft based SATCOM terminal depending upon aircraft speed and heading. In reference to the aircraft based SATCOM terminal, a LEO satellite rises at a relative low velocity then increases velocity until peaking, followed by falling velocity until the LEO satellite falls out of the range. FIG. 4 illustrates example velocity vectors of a pair of LEO satellites relative to an aircraft velocity vector.

Frequency Drift and Doppler Correction for Velocity Changes Between LEO Satellites and Aircraft:

The SATCOM system comprising the GEO satellite gateway, GEO satellite, and aircraft terminal each experience frequency drift over time. The active Radio Frequency (RF) components such as oscillators, frequency synthesizer, etc. contribute to frequency drift over time. Temperature variation is also the contributor in frequency shift in such equipment. Frequency change results in longer LEO satellite acquisition and hand-off time between LEO satellites by the aircraft based SATCOM terminal. Longer hand-off time may be acceptable if the recurrence of hand-off is infrequent. However, in the LEO satellite system recurrence hand-off is relatively fast—approximately every 5-6 minutes. Three primary sources cause a frequency drift in the SATCOM system:

1) Ground station serving LEO satellite having frequency drift over time;
2) LEO satellites having frequency drift over time; and
3) aircraft based SATCOM terminal having frequency drift over time.

In addition to frequency drift, the Doppler frequency shifts are caused by:

1) Speed and direction of the LEO satellites; and
2) Speed and direction of the aircraft.

While a communication link is maintained between the aircraft based SATCOM terminal and a LEO gateway via a LEO satellite, the communication link signaling can function to actively correct for frequency drift. In contrast, when the aircraft based SATCOM terminal activates for the first time to attempt to acquire a LEO satellite or when it is performing hand-off from one LEO satellite to the next LEO satellite, such uncertainty in frequency drift can cause a relatively long delay in the LEO satellite acquisition and switch between LEO satellite, with resulting loss of broadband service during the delay period.

The management aperture 200 operating with the management modem 210 can receive real-time information indicating the frequency drift from the system and velocity vector of the satellite. Position information of the aircraft accessible via ARINC 429 communication bus or GPS provides data to compute velocity vector of the aircraft. Such information is supplied to the broadband modem system. With the raw information, the modem estimates the precise receive and transmit frequency for the transceivers connected to the broadband aperture 230, accounting for frequency drift from all components. The information enables rapid, e.g., instantaneous, LEO satellite switching with negligible switch outage. Without availability of this information, approximately 6 seconds of broadband service outage is expected to occur during each handover (handoff) procedure to switch between LEO satellites.

Multicast IP Television and Other Content

An individual LEO satellite serves an aircraft terminal for only for few minutes due to the high velocity of the LEO satellite. As a result, if multicast IP television and other content were to be distributed through LEO satellites, the IP television and other content would need to be concurrently distributed to several LEO satellites interconnected by many corresponding ground earth stations. Scaling the need for multicasting the IP television and other content to several hundred aircraft results in replication of multicast bandwidth by a large factor.

In contrast according to some embodiments of the present disclosure, IP television and other content is distributed from a GEO satellite gateway Earth station through a GEO satellite to all aircraft within the service area of the GEO satellite. Distributing such IP television and other content to a large number of aircraft in a continental-size region then only necessitates one multicast path, which reduces the need to send the multiple replica of same multicast content distribution of IP television and other content.

Figure 5:
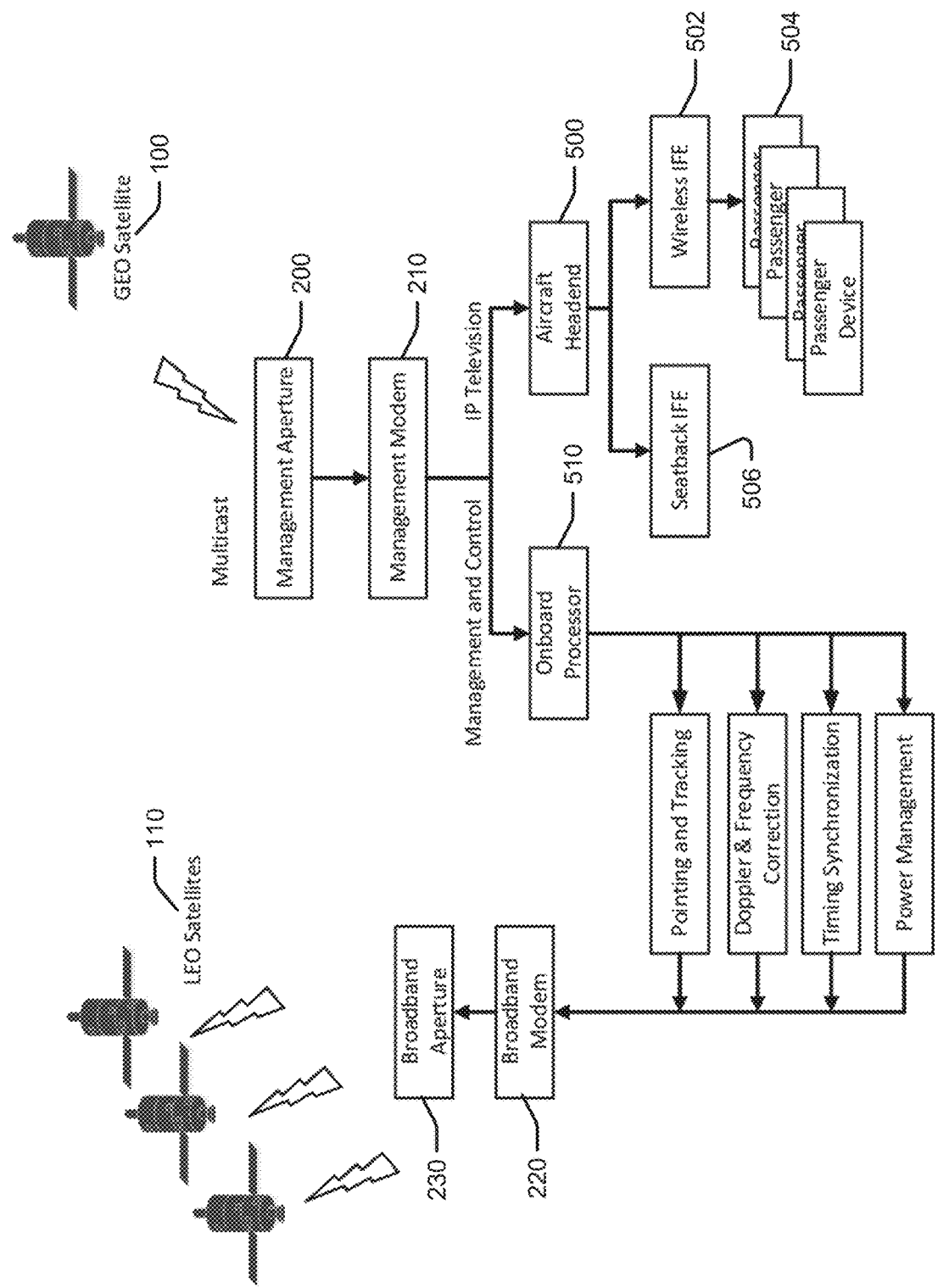
FIG. 5 illustrates a block diagram of an aircraft based SATCOM terminal according to some embodiments of the present disclosure.

FIG. 5 illustrates a block diagram of an aircraft based SATCOM terminal according to some embodiments of the present disclosure. Referring to FIG. 5, the management aperture 200 and the management modem 210 receive the multicast stream via a GEO satellite, with occasional handoff occurring between GEO satellites depending upon location and route traveled by the aircraft. All aircraft based SATCOM terminals, configured with dual aperture dual modem SATCOM configurations or similar terminals, are capable of receiving the same stream of multicast in a relatively large geographic area covered by the wide GEO satellite beam. The multicast stream and therefore contain not just the management & control information used for acquiring and performing handoff between LEO satellites, but moreover can contain IP television and other content.

The multicast IP television is separated from the stream of multicast by the management modem 210 and forwarded to the aircraft headend, e.g., inflight entertainment content server. For passengers, near-real-time multicast IP television is accessible from the aircraft headend via seat inflight entertainment (IFE) systems (e.g., seatback IFE displays and audio interfaces) and/or via wireless IFE (W-IFE) distributed through wireless access points for playout through PEDs. Passengers can thereby watch multicast television on seatback displays, armrest displays, cabin partition displays, overhead displays, and/or via a myriad of passenger transported PEDs such as smart phones, tablet computers, and laptop computers.

The management and control information from the multicast stream is forwarded to an onboard processor. The onboard processer may reside within the management modem 210 and/or the broadband modem 220. The primary information can include:

1) LEO satellite position and time in an industry-standard format such as North American Aerospace Defense Command (NORAD) Two Line Element Set (TLE);

2) Ground earth station information such as location, altitude, and feeder link characteristics to satellites; and 3) Radio Frequency (RF) information of uplink and downlink path such as center frequency, symbol rate, frequency oscillator drift, antenna scan loss, polarization type, etc.

TLE is a data format encoding a list of orbital elements of the LEO satellites for a given point in time, the epoch. A prediction formula processes the TLE to estimate the state (position and velocity) of the LEO satellites at any point in the past or future.

The mission control center 300 can receive LEO satellite position tracking information from Telemetry Tracking and Command (TT&C) stations geographically spaced apart along the path of the LEO satellites 110, e.g., such as the TT&C 1 Station and TT&C 2 Station illustrated in FIG. 3.

Management and control information received as part of the multicast stream from the GEO satellite can be raw and require an onboard processor to further process. The onboard processor's functional capability may reside within the modem system to ensure the delay in receiving raw data, processing, and forwarding is minimized. Such information is used for precise and real-time computation and processing to enable.

1) Pointing and Tracking of the broadband aperture antenna relative to the LEO satellites;

2) Doppler and frequency correction of the broadband modem 220 signaling through the broadband aperture 230;

3) Timing synchronization of the broadband modem 220 signaling through the broadband aperture 230; and 4) Power management of the broadband modem 220 transmission's signaling through the broadband aperture 230.

Advantages of Multicast Television Distribution through GEO Satellites

Figure 6:
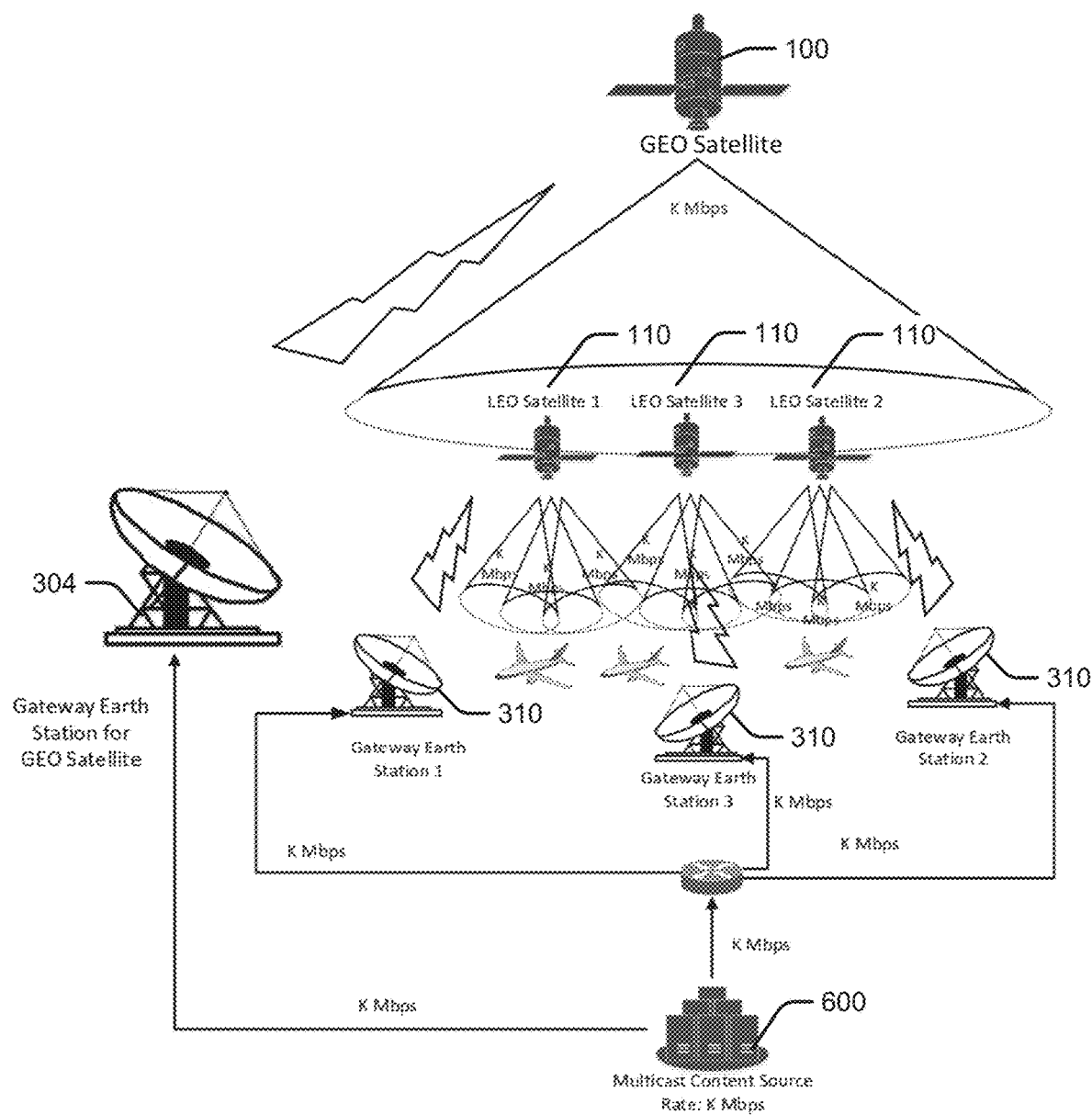
FIG. 6 illustrates system components that are used for multicasting content through a GEO satellite and for multicasting the same content through LEO satellites according to some embodiments of the present disclosure.

In accordance to some embodiments, multicast television is multicast through a GEO satellite in the same stream as the management and control information. Multicast television is a primary method to deliver the television content such as movies, television shows, news channels, financial information, sporting events, etc. Delivering television content over a network of LEO satellites and ground stations is complex and consumes significant frequency spectrum and processing resources. A worksheet shown Table 1 provides comparative estimates of resource consumption for multicasting television content through LEO satellites versus a GEO satellite in order to deliver the same television content to aircraft based SATCOM terminals. FIG. 6 illustrates system components that are used for multicasting content through a GEO satellite and for multicasting the same content through LEO satellites, in accordance with some embodiments of the present disclosure.

TABLE 1

Multicast resource consumption worksheet

| Parameters | GEO Satellite | LEO Satellites |
|---|---|---|
| Service | Multicast | Multicast |
| Source Data Rate (Mbps) | K | K |
| Terrestrial Multicast Replication | 1 | 3 |
| Terrestrial Multicast Consumption (Mbps) | K | 3K |
| Number of Beams Per Satellite | 1 | 3 |
| Satellite Multicast Replication | 1 | 3 |
| Satellite Multicast Consumption Per Satellite (Mbps) | K | 3K |
| Satellite Multicast Consumption Total (Mbps) | K | 9K |
| Total Multicast Resource Consumption (Mbps) | K | 12K |

Referring to Table 1 and FIG. 6, for the GEO satellite multicast approach, multicast content from a content source 600, e.g., IP television server, is provided to the LEO mission control center 300 (FIG. 3) for transmission through the gateway Earth station 304 to the GEO satellite 306 for relay to the aircraft based SATCOM terminals. In contrast, for the LEO satellites multicast approach, the multicast content from the content source 600 is replicated and provided to three gateway Earth stations 310 for transmission through three corresponding LEO satellites 308 for relay to the aircraft based SATCOM terminals.

In both approaches, the K Mbps of multicast content is subject to be delivered to all the aircraft based SATCOM terminals flying in a certain region. In the LEO satellite multicast approach, the K Mbps is distributed to three ground Earth stations terrestrially. This results in terrestrial total bandwidth consumption of 3×K Mbps. The same content is uplinked to three LEO satellites with each consisting of three beams. Each LEO satellite will consume a bandwidth of 3×K Mbps for all three beams. At the end, a total of 12×K Mbps of multicast bandwidth resource has been consumed to deliver the original content size of K Mbps. In sharp contrast, for the GEO satellite approach the same K Mbps is sent to the ground Earth station 304 terrestrially. The ground Earth station 304 transmits the content in uplink to the GEO satellite 306 with a large continental scale beam for distribution to all the aircraft based SATCOM terminals within the service area of the GEO satellite 306. It is a factor of 12 additional resources required to deliver the same content to all aircraft based SATCOM terminals in a given geographic area by LEO satellites 310 versus the GEO satellite 306. Consequently, significant resource conservation can be achieved by multicasting television and other content through the GEO satellite 306 to the aircraft based SATCOM terminals.

When the aircraft based SATCOM terminals are configured with receive only management modems that operate to separate the multicast television traffic for distribution to the aircraft headend, any associated return path communications for, e.g., packet retransmission requests, can be provided through the broadband modem 220 and broadband aperture 230 via the LEO satellites to the responsible Earth based network node, e.g., the multicast content source 600.

Broadband Aperture Antenna Pointing and Tracking

Controlling pointing and tracking of the broadband aperture antenna are a critical function of the aircraft SATCOM terminal. In a conventional Earth based GEO satellite terminal, a fixed antenna is manually pointed to the target GEO satellite once during installation and can remain unchanged for its operational lifetime. In contrast, for mobile applications such as aeronautical broadband services, aircraft motion necessitates active control of where the aperture antenna is pointed to track an acquired satellite. Because commercial aircraft travel at high speed with extended range, providing broadband communications services using a LEO satellite constellation provides many significant challenges.

1) The aircraft SATCOM terminal requires position and time information of all potential LEO satellites, and any time lag in obtaining such information may result in miss-pointing relative to a target LEO satellite.

2) An aircraft may be out of service for many days for maintenance or other activities, during which time the SATCOM terminal will not have access to satellite links to obtain satellite position and time information due to lack of power and/or being parked within the hanger blocking the links.

3) An aircraft antenna relies on a set of configuration information to steer the antenna in a certain direction toward a target satellite. When delivery of the configuration information to the aircraft SATCOM terminal has not occurred, e.g., due to failed satellite link, the terminal is unable to actively steer the antenna toward any target LEO satellite.

The dual aperture dual modem SATCOM terminal disclosed herein overcomes these challenges using a combination of LEO and GEO satellites, in accordance with some embodiments.

1) A GEO satellite has a very large service coverage, ⅓rd of the entire earth. A large field of view beam can cover an entire continent such as the Americas.

2) A large GEO beam can deliver a multicast stream to an entire continent. For example, all domestic aircraft can potentially be covered in a single multicast stream.

3) The relative position of a GEO satellite is fixed. This gives the most reliable path to deliver mission-critical information for an aircraft broadband system. The aircraft which may be in the hanger for maintenance and brought back to service after a month still has a reliable link with GEO satellites to receive management information that is used to control the broadband modem 220 and aperture for acquiring and performing handoff between NGSO satellites, such as LEO satellites.

The the management aperture and the broadband aperture are independently steerable by operations performed by at least one processor. The management aperture is steered by the operations toward a selected GSO satellite and the broadband aperture is steered by the operations toward a selected one of the NGSO satellites. In accordance with some embodiments, the management aperture and/or the broadband aperture are at least one of: mechanically steered horn array; electronically scanned phased array; hybrid electro-mechanically steered array; and gimbaled reflector.

FIG. 7 illustrates a block diagram of an aircraft based SATCOM terminal configured according to some embodiments of the present disclosure. Referring to FIG. 7, the management modem 210 and/or the onboard processor 510 can separate the multicast stream received through the GEO satellite 100 into IP television and management & control information. The management & control information is processed by the onboard processor 510 to generate, for example: 1) pointing and tracking information for controlling pointing of the broadband aperture 230; Doppler frequency correction information controlling transmission and reception by the broadband modem 220; timing synchronization information controlling timing of transmission and reception signaling by the broadband modem 220; and power management information controlling transmission signal power level of the broadband modem 220.

TLE data for all LEO satellites is part of the management and control information extracted from the multicast stream. Three types of information (among others) that are determined from the management and control information include the latitude, longitude, and altitude of LEO satellites as a function of time.

On the aircraft side, two primary possible sources provide the latitude, longitude, attitude, and altitude of the aircraft and an indication of time. One such source is the ARINC 429 communication bus 700 which can provide aircraft navigation information. Another source is a GPS receiver and accelerometer 710 which can be part of the overall antenna system. Either of these sources 700 and 710 provides the key location information of the aircraft in a given time. The GPS receiver and accelerometer 710 can be a better source of aircraft location information because of its lower latency relative to obtaining such information through the ARINC 429 communication bus 700.

The combination of the satellite position and aircraft position allows an Antenna Control Unit (ACU) 222 (FIG. 7) to compute the pointing information—elevation angle and azimuth angle at a given time. The pointing information is used to control the antenna aperture to be directed to the target LEO satellite for transmitting and receiving data via the target LEO satellite. If service is disrupted in mid-flight due to miss-pointing or miss-tracking, the new LEO satellite position and time information will be quickly obtained through updates inflight over the GEO satellite 100 using the management aperture 200 and management modem 210.

Transmission Power Level Management by Aircraft SATCOM Terminal

Figure 8:
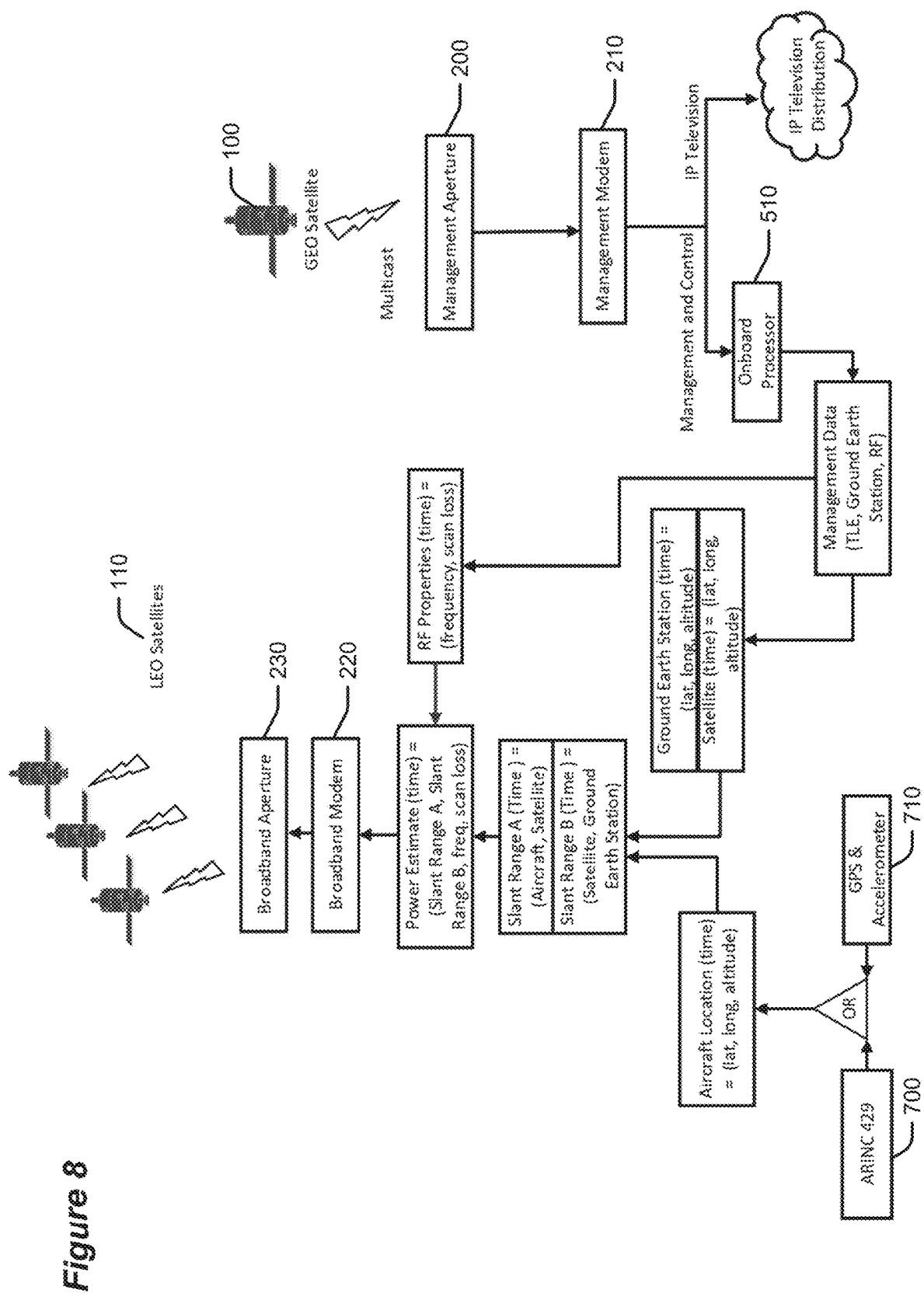

FIG. 8 illustrates a block diagram of an aircraft based SATCOM terminal configured according to some embodiments of the present disclosure. Referring to FIG. 8, transmission power level management is a critical part of satellite communication. Transmissions toward LEO satellites involve multi-dimensional variables which need to be computed in real-time and which complicates the estimation of an optimal transmission power level. Once the aircraft SATCOM terminal is already linked through a LEO satellite 110 to a LEO gateway Earth station 310 (FIG. 3), the aircraft broadband modem 220 operates with the LEO gateway Earth station 310 (FIG. 3) to determine and control the broadband modem 220 to transmit at an optimal power level toward the LEO satellite 110. However, when the broadband modem 220 is attempting to initially acquire the LEO satellite 110 or to switch to another LEO satellite 110, the broadband modem 220 will require additional information to ensure it transmits at an acceptable power level that can be effectively received by the LEO satellite and associated gateway Earth station 310 (FIG. 3). The challenges can include that excessive transmission power level can saturate the LEO satellite front-end circuitry, exceed a regulatory limit, and/or result in an unsuccessful link by exceeding the dynamic window. In contrast, insufficient transmission power level can fail to establish a communication link with the LEO satellite.

Because the relative LEO satellite position rapidly changes in real-time, the distance between the aircraft terminal and LEO satellite rapidly changes—also referred to by slant range between the receiver and transmitter. The distance is furthest at the horizon, reduces to smallest at the zenith, and then grows back to the furthest as the LEO satellite falls out of the horizon. The free space path loss is directly proportional to the slant range. A transmitter operating with inaccurate slant range may transmit at a power level too high or too low resulting in possible failed handoff to a new LEO satellite, failed acquisition to a new LEO satellite, and result in a long hand-off time to join a new LEO satellite.

The multicast management and control information processed by the onboard processor 510 can include TLE and RF data. The LEO satellite position information—latitude, longitude, and altitude are extracted as a function of time. On the other hand, the precise location of the aircraft is available via GPS and accelerometers 710 as a part of the antenna system or via ARINC 429 communication bus 700. Two sources of information are processed to calculate the distance between the aircraft terminal and LEO satellite—called Slant Range A in FIG. 8. Similarly, the ground Earth station location data is part of multicast management and control information. The LEO satellite position data and ground Earth station position data are used for estimation of the distance between the LEO satellite and ground Earth station—called Slant Range B in FIG. 8. The broadband modem 220 uses the two slant ranges to estimate the transmission power level to be used for transmission at the time of LEO satellite switching. One slat range information is needed if the LEO satellite is equipped with onboard modulation and demodulation. Other information such as frequency of the entry channel and antenna gain at a given scan angle can be used in estimation of the transmission power level to be used for transmission as a function of time.

Doppler and Frequency Correction By Broadband Modem of Aircraft SATCOM Terminal

Figure 9:
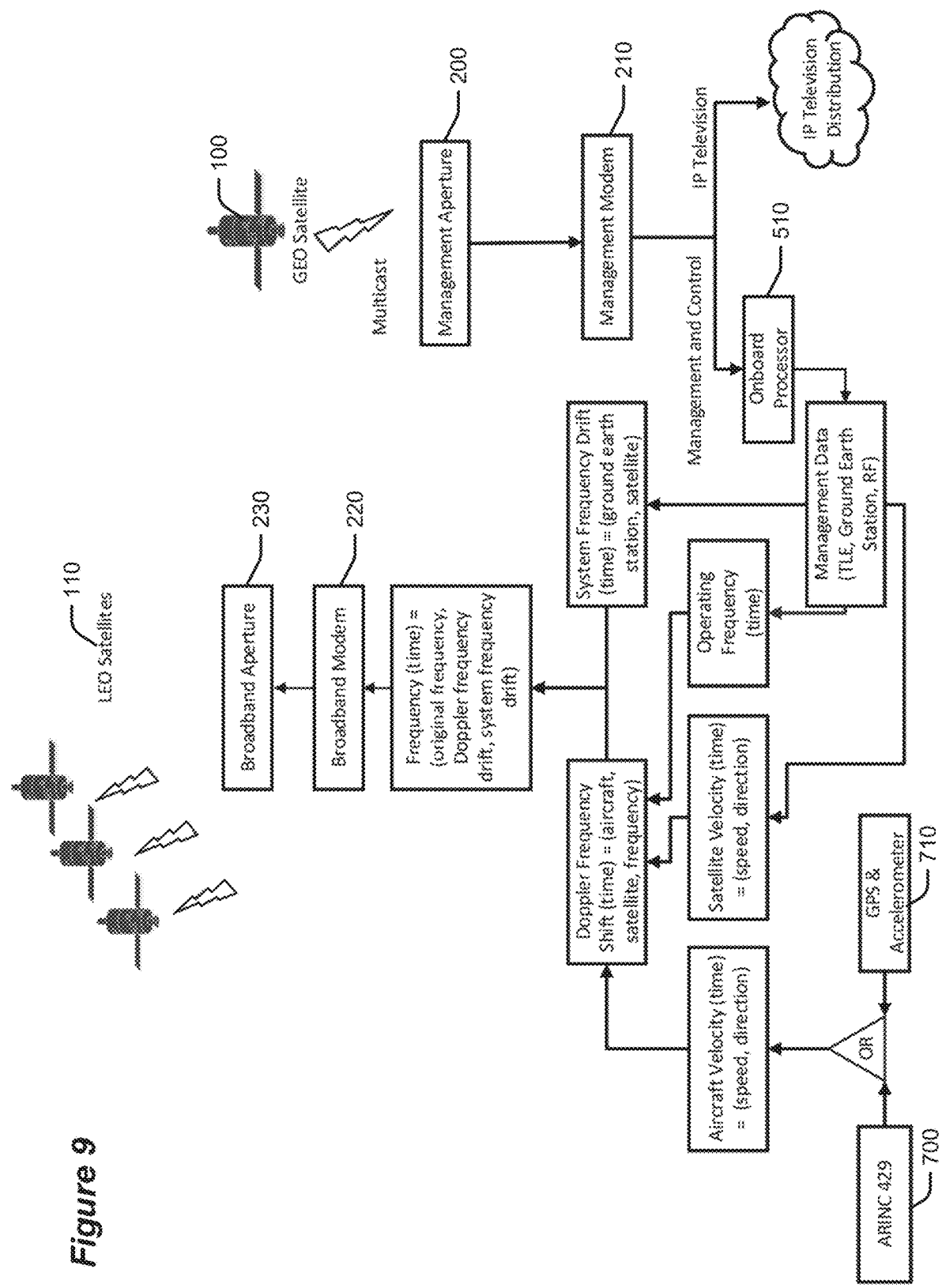

FIG. 9 illustrates a block diagram of an aircraft based SATCOM terminal configured according to some embodiments of the present disclosure. Referring to FIG. 9, the velocity of a LEO satellite is relatively high compared to the aircraft terminal. A LEO satellite orbiting at an altitude of 610 Km has a velocity of 7.55 Km/sec. The velocity of the commercial aircraft could as high as 926 Km/hr. More importantly, the relative velocity changes when the heading directions of the aircraft and orbiting LEO satellite at a certain altitude are considered. In accordance with some embodiments, the SATCOM terminal is configured to compensate for changes in the relative velocity and acceleration by, e.g., adjusting the broadband modem frequency to compensate for the rate of change and absolute change in Doppler frequency.

In addition, the three primary systems, ground Earth station, LEO satellite, and aircraft SATCOM terminal each have an oscillator that is subject to drift in frequency. In accordance with various embodiments, the aircraft SATCOM terminal is configured to be informed of the frequency drift of the ground Earth station and LEO satellites (e.g., frequency drift values for the ground Earth station and LEO satellites) through the management information received via the GEO satellite 100 and extracted by the management modem 210 and processed by the onboard processor 510. The onboard processor 510 can perform operations to control the broadband modem 220 to compensate for the oscillator drift of the ground Earth station and LEO satellite indicated by the received management information, and to further compensate for the oscillator drift determined for the broadband modem 220 itself. Without such oscillator drift compensation, the broadband modem 220 may need to scan the possible frequency range used by the LEO satellite which would delay acquisition and/or handoff between LEO satellites 110.

Similar to previous processes, multicast management and control information processed by the onboard processor 510 includes TLE, ground Earth station position, and RF data. The TLE data is processed to calculate the real-time velocity of the LEO satellites 110. The aircraft location data from ARINC 429 bus 700 or GPS 710 is processed to calculate the real-time velocity of the aircraft. The two velocity vectors are used to determine the relative velocity between a particular LEO satellite and aircraft SATCOM terminal. The management and control information includes operating frequency and frequency drift of the particular GEO satellite 110 and a LEO ground Earth station 310 paired with the particular GEO satellite 110. The operating frequency along with relative velocity are used to determine the Doppler frequency drift. The frequency drifts, primarily caused by oscillators due to factors like ambient temperature, is used with the determined Doppler frequency to determine with the final frequency estimation.

When seeking to acquire a communication link with a first LEO satellite, the broadband modem 220 uses the frequency estimation performed using the management and control information relating the first LEO satellite to tune the transmitter and receiver frequencies to communicate with the first LEO satellite. In contrast, when seeking to perform handoff from the first LEO satellite to a second LEO satellite, the broadband modem 220 uses the frequency estimation performed using the management and control information relating the second LEO satellite to tune the transmitter and receiver frequencies to communicate with the second LEO satellite.

Timing Synchronization by Broadband Modem of Aircraft SATCOM Terminal

Figure 10:
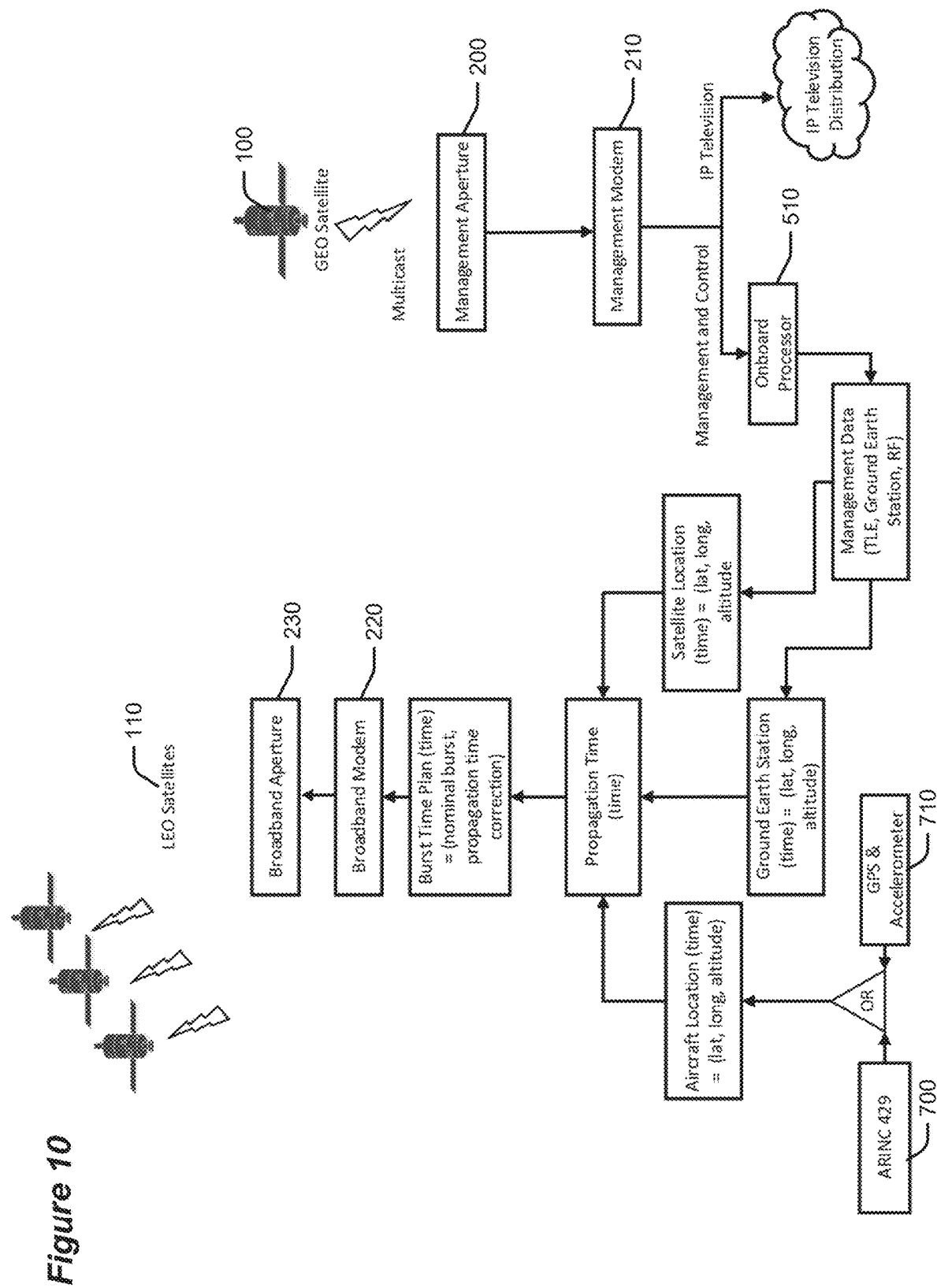

FIG. 10 illustrates a block diagram of an aircraft based SATCOM terminal configured according to some embodiments of the present disclosure. Referring to FIG. 10, the LEO satellite system may employ Time Division Multiple Access (TDMA) and/or beam hopping. Both capabilities are highly desirable but sensitive to varying propagation delays. The position of the LEO satellites relative to the aircraft continuously changes. The difference in change is largest when the aircraft SATCOM terminal needs to perform handoff from one LEO satellite to another LEO satellite. As explained above, the aircraft SATCOM terminal needs to frequently (e.g., every 5-6 minutes) perform handoff to switch to a new LEO satellite with different orbital properties. It is important for the broadband modem 220 to have an accurate time estimation for transmission and reception opportunities for communications with a LEO satellite. An inaccurate time estimation can result in burst time collision with failed or slow acquisition of a LEO satellite and lack of timing synchronization between hopped satellite beam and terminal.

In accordance with some embodiments, the management and control information obtained through the GEO satellite 100 is used to synchronize the transmission and receiving opportunity timing. Location data for the LEO ground Earth station, the LEO satellite, and the aircraft are used to determine a communication opportunity burst time plan for the broadband modem 220 to transmit signals toward a LEO satellite and to receive signals from the LEO satellite. The TLE data provides raw information about LEO satellite location with time. Similarly, the management and control information includes the location of the ground Earth station. The aircraft position data is obtained from either ARINC 429 bus 700 or GPS 710. The position of the aircraft and LEO satellite can be obtained in real-time. Hence, the velocity vector between the aircraft and LEO satellite can be also determined in real-time. The position of the ground Earth station does not change, except when handoff is performed to a new LEO satellite which is paired to a different ground Earth station.

The next step is to process the position data to calculate the propagation delay in real-time. The broadband modem 220 uses the propagation delay coupled with the command information to tunes the receiver and transmitter according to computed burst time and burst window. The burst time is generally referenced to a nominal time and delay. The burst windows could be nanoseconds to milliseconds. The precision of burst time must be very high. An error in the computed distance between the LEO satellite and aircraft positions can result in inaccurate burst time delay failing to access the LEO satellite.

Figure 11:
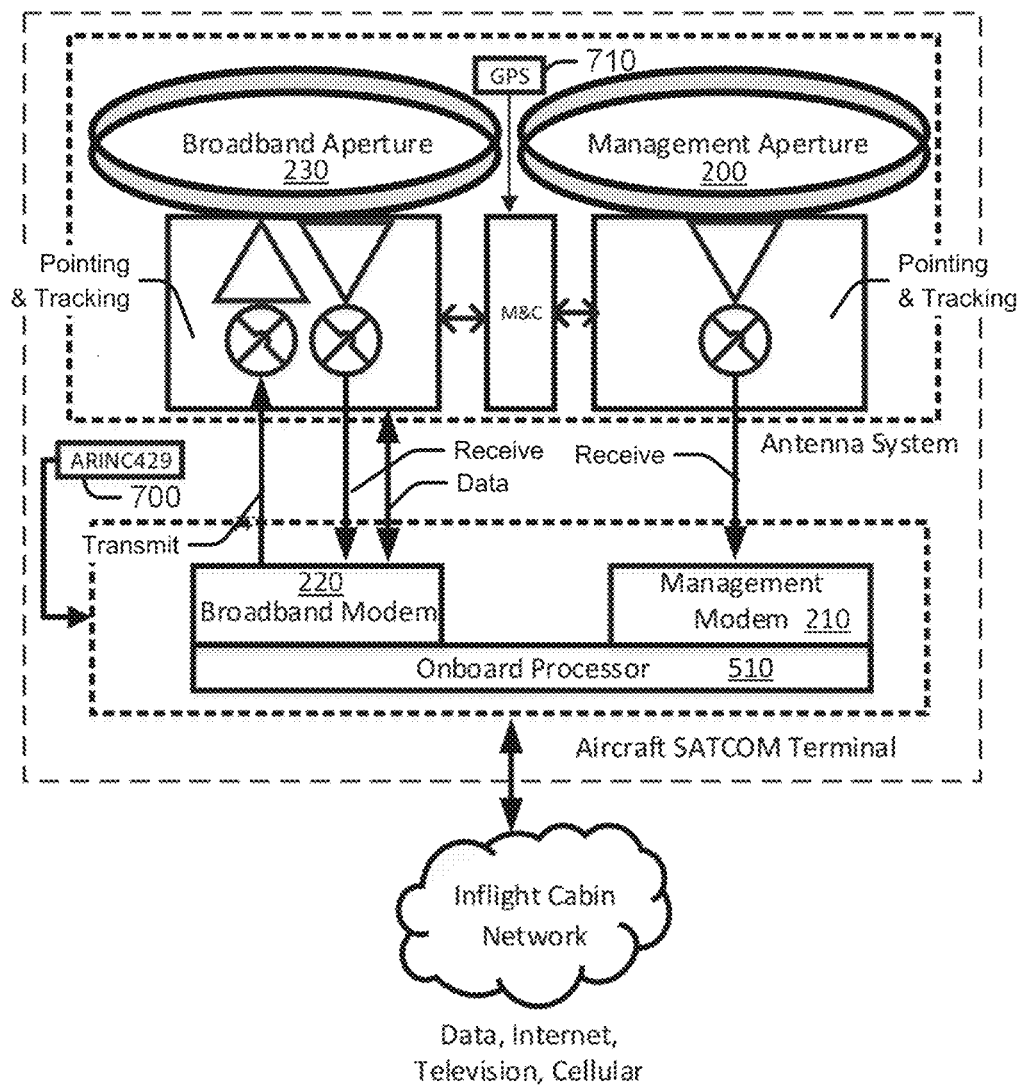
FIG. 11 illustrates a block diagram of a dual aperture dual modem SATCOM terminal which is configured according to some embodiments of the present disclosure.

FIG. 11 illustrates a block diagram of a dual aperture dual modem SATCOM terminal which is configured according to some embodiments of the present disclosure. Referring to FIG. 11, the management aperture 200 receives management and control information from a GEO satellite which is provided to the management modem 210 for extraction. The management and control information is processed by the onboard processor 510 and used to control operation of the broadband modem 220 and pointing and tracking of broadband aperture 230 as explained in the embodiments above. As explained above, the onboard processor 510 can provide broadband data, such as streaming video, streaming audio, files, online gaming data, Internet browser data, cellular communications data, etc. which is received through the broadband aperture 230 and broadband modem 220 to the inflight cabin network for receipt by inflight entertainment systems and/or PEDs. The inflight cabin network can include wired (e.g., Ethernet) and/or wireless networks (e.g., WLAN). The onboard processor 510 can also distribute broadcast television which is received through the management aperture 200 and management modem 210 to an IFE headend to allow passenger selection among the broadcasted television channels.

Further Definitions and Embodiments:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A mobile satellite communication (SATCOM) terminal comprising:
   a broadband aperture configured to communicate through non-geostationary orbit (NGSO) satellites for broadband communications;
   a management and broadcast-multicast aperture configured to receive, from a geostationary orbit (GSO) satellite, NGSO satellite management information;
   at least one processor; and
   at least one memory storing instructions executable by the at least one processor to perform operations to:
     receive the NGSO satellite management information from the GSO satellite, wherein the NGSO satellite management information indicates positions and associated time of a set of the NGSO satellites;
     acquire a second communication link with a second NGSO satellite among the set using the NGSO satellite management information during handoff switching from using a first communication link that was previously acquired with a first NGSO satellite to using the second communication link being acquired with the second NGSO satellite; and
     perform broadband communications through the broadband aperture and the second communication link with the second NGSO satellite.

2. The mobile SATCOM terminal of claim 1, wherein the set of NGSO satellites is one of: a set of low Earth orbit (LEO) satellites; a set of medium earth orbit (MEO) satellites; and a set of highly elliptical orbit (HEO) satellites.

3. The mobile SATCOM terminal of claim 1, wherein the operations control directional pointing of the broadband aperture based on a position and time of one of the NGSO satellites determined from the NGSO satellite management information to acquire the second communication link with the second NGSO satellite.

4. The mobile SATCOM terminal of claim 3, wherein the operations:
   generate antenna pointing information based on latitude, longitude, altitude, and associated time of the second NGSO satellite determined from the NGSO satellite management information and based on latitude, longitude, altitude, and associated time of an aircraft transporting the SATCOM terminal; and
   control the directional pointing of the broadband aperture based on the antenna pointing information to acquire the second communication link with the second NGSO satellite.

5. The mobile SATCOM terminal of claim 1, wherein the operations control transmitter and/or receiver signaling timing for acquiring the second communication link with the second NGSO satellite, based on location and associated time of the second NGSO satellite indicated by the NGSO satellite management information and based on location and associated time of an aircraft transporting the SATCOM terminal as obtained from a communication bus of the aircraft.

6. The mobile SATCOM terminal of claim 1, wherein:
   the operations control transmission power level through the management aperture toward the second NGSO satellite based on the position of the second NGSO satellite indicated by the NGSO satellite management information and based on position of an NGSO satellite gateway Earth station which is indicated by the NGSO satellite management information and which is serving the second NGSO satellite, to acquire the communication link with the second NGSO satellite.

7. The mobile SATCOM terminal of claim 6, wherein the operations to control transmission power level through the management aperture comprise to:
   estimate a first slant range between the second NGSO satellite and the NGSO satellite gateway Earth station serving the second NGSO satellite, based on latitude, longitude, and altitude of the second NGSO satellite determined from the NGSO satellite management information and based on latitude, longitude, and altitude of the NGSO satellite gateway Earth station determined from the NGSO satellite management information;
   estimate a second slant range between the second NGSO satellite and an aircraft transporting the SATCOM terminal, based on the latitude, the longitude, and the altitude of the second NGSO satellite determined from the NGSO satellite management information and based on latitude, longitude, and altitude of the aircraft; and
   estimate a transmission power level to be used for transmission to acquire the communication link with the second NGSO satellite, based on the first and second slant ranges.

8. The mobile SATCOM terminal of claim 1, wherein:
   the NGSO satellite management information further indicates frequency drift of the set of the NGSO satellites and/or frequency drift of at least one NGSO satellite gateway Earth station serving the NGSO satellites; and
   the operations estimate frequency to be used for receiving signaling from the second NGSO satellite during acquisition and/or to be used for transmitting signaling to the second NGSO satellite during acquisition, based on the frequency drift indicated by the NGSO satellite management information for the second NGSO satellite and for the NGSO satellite gateway Earth station serving the second NGSO satellite.

9. The mobile SATCOM terminal of claim 1, wherein:
the NGSO satellite management information further indicates speed and direction of the NGSO satellites in the set; and
the operations estimate frequency to be used for receiving signaling from the second NGSO satellite during acquisition and/or to be used for transmitting signaling to the second NGSO satellite during acquisition, based on the speed and direction of the second NGSO satellite indicated by the NGSO satellite management information and based on speed and direction of an aircraft transporting the SATCOM terminal as obtained from a communication bus of the aircraft.

10. The mobile SATCOM terminal of claim 1, further comprising:
a broadband modem coupled to the broadband aperture and configured by the operations to establish the second communication link for bidirectional communications through the second NGSO satellite using the NGSO satellite management information; and
a management and broadcast-multicast modem coupled to the management and broadcast-multicast aperture and configured by the operations to receive the NGSO satellite management information from the GSO satellite.

11. The mobile SATCOM terminal of claim 10, wherein:
the management and broadcast-multicast modem is configured by the operations for unidirectional receive-only communications to receive the NGS0 satellite management information contained in broadcast-multicast traffic from the GSO satellite, and the broadband aperture is configured by the operations for the bidirectional communications through the second communication link with the second NGSO satellite.

12. The mobile SATCOM terminal of claim 10, wherein:
the management and broadcast-multicast modem is configured by the operations for bidirectional communications to receive the NGSO satellite management information contained in broadcast-multicast traffic from the GSO satellite and to transmit unicast traffic from crew and passengers to the GSO satellite.

13. The mobile SATCOM terminal of claim 10, further comprising an electronically scanned phase array antenna having a receive-only physical aperture with multi-beam capability and a transmit-only physical aperture,
wherein the receive-only physical aperture of the electronically scanned phase array antenna is configured by the operations to provide a first electronically steerable receive beam steered toward the GSO satellite to receive broadcast communications including the NGSO satellite management information and is further operated to provide a second electronically steerable receive beam steered toward the second NGSO satellite based on the NGSO satellite management information to receive broadband communications from the second NGSO satellite, and
wherein the transmit-only physical aperture of the electronically scanned phase array antenna is operated to provide an electronically steerable transmit beam steered toward the second NGSO satellite based on the NGSO satellite management information to transmit broadband communications to the second NGSO satellite.

14. The mobile SATCOM terminal of claim 10, wherein:
the management and broadcast-multicast aperture and the broadband aperture are independently steerable by the operations, the management and broadcast-multicast aperture is steered by the operations toward a selected GSO satellite and the broadband aperture is steered by the operations toward a selected one of the NGSO satellites.

15. The mobile SATCOM terminal of claim 10, wherein:
the management and broadcast-multicast aperture and the broadband aperture are at least one of: mechanically steered horn array; electronically scanned phased array; hybrid electro-mechanically steered array; and gimbaled reflector.

16. The mobile SATCOM terminal of claim 10, wherein the broadband communications comprise receiving at least one of streaming movies, streaming music, streaming games, file transfers, and Internet browser data from ground based network content servers via the broadband aperture and the second communication link with the second NGSO satellite.

17. The mobile SATCOM terminal of claim 10, wherein the operations further receive from the GSO satellite through the management and broadcast-multicast aperture:
broadcast-multicast media streaming including at least one of live television, Internet protocol television traffic, and audio streaming, and
broadcast-multicast data transfers including at least one of airline operational data, weather maps, on-board content updates, and caching information; and
wherein the operations are further configured to receive the NGSO satellite management information in periodic broadcasts from the GSO satellite.

18. A method by a mobile satellite communication (SATCOM) terminal, the method comprising:
receiving non-geostationary orbit (NGSO) satellite management information from a geostationary orbit (GSO) satellite, wherein the NGSO satellite management information indicates positions and associated time of a set of the NGSO satellites;
acquiring a second communication link with a second NGSO satellite among the set using the NGSO satellite management information during handoff switching from using a first communication link that was previously acquired with a first NGSO satellite to using the second communication link being acquired with the second NGSO satellite; and
performing broadband communications through a broadband aperture and the second communication link with the second NGSO satellite.

19. A computer program product comprising a non-transitory computer readable medium storing instructions executable by at least one processor of a mobile satellite communication (SATCOM) terminal to perform operations comprising to:
receive non-geostationary orbit (NGSO) satellite management information from a geostationary orbit (GSO) satellite, wherein the NGSO satellite management information indicates positions and associated time of a set of the NGSO satellites;
acquire a second communication link with a second NGSO satellite among the set using the NGSO satellite management information during handoff switching from using a first communication link that was previously acquired with a first NGSO satellite to using the second communication link being acquired with the second NGSO satellite; and perform broadband communications through a broadband aperture and the second communication link with the second NGSO satellite.

* * * * *